United States Patent
Kahara et al.

(10) Patent No.: US 8,376,767 B2
(45) Date of Patent: Feb. 19, 2013

(54) LOCKING DEVICE FOR POWER FEEDING PLUG

(75) Inventors: Keiji Kahara, Aichi (JP); Toshiharu Katagiri, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 26 days.

(21) Appl. No.: 13/101,802

(22) Filed: May 5, 2011

(65) Prior Publication Data

US 2011/0277516 A1 Nov. 17, 2011

(30) Foreign Application Priority Data

May 12, 2010 (JP) ................................. 2010-110563

(51) Int. Cl.
*H01R 13/62* (2006.01)
(52) U.S. Cl. ........................................................ 439/304
(58) Field of Classification Search .................. 439/304, 439/310, 133, 350, 342
See application file for complete search history.

(56) References Cited

U.S. PATENT DOCUMENTS

| | | | | |
|---|---|---|---|---|
| 5,306,999 A | * | 4/1994 | Hoffman | 320/109 |
| 5,478,250 A | * | 12/1995 | Hoffman | 439/142 |
| 5,545,049 A | * | 8/1996 | Hasegawa et al. | 439/310 |
| 5,627,448 A | * | 5/1997 | Okada et al. | 439/133 |
| 5,639,256 A | * | 6/1997 | Endo et al. | 439/358 |
| 5,664,960 A | * | 9/1997 | Fukushima | 439/310 |
| 5,674,086 A | * | 10/1997 | Hashizawa et al. | 439/310 |
| 5,751,135 A | * | 5/1998 | Fukushima et al. | 320/107 |
| 5,873,737 A | * | 2/1999 | Hashizawa et al. | 439/39 |
| 5,906,500 A | * | 5/1999 | Kakuta et al. | 439/310 |
| 6,123,569 A | * | 9/2000 | Fukushima et al. | 439/456 |
| 8,016,604 B2 | * | 9/2011 | Matsumoto et al. | 439/304 |
| 8,025,526 B1 | * | 9/2011 | Tormey et al. | 439/528 |
| 8,075,329 B1 | * | 12/2011 | Janarthanam et al. | 439/304 |
| 8,197,277 B1 | * | 6/2012 | Teichmann | 439/304 |
| 8,206,184 B2 | * | 6/2012 | Kwasny et al. | 439/695 |
| 2009/0095038 A1 | * | 4/2009 | Katagiri | 70/392 |

FOREIGN PATENT DOCUMENTS

| | | |
|---|---|---|
| JP | 9-161898 A | 6/1997 |
| JP | 2009-081917 A | 4/2009 |
| JP | 2010-004731 A | 1/2010 |

* cited by examiner

*Primary Examiner* — Alexander Gilman
(74) *Attorney, Agent, or Firm* — Patterson Thuente Christensen Pedersen, P.A.

(57) ABSTRACT

A locking device that prevents unauthorized removal of a power feeding plug from an inlet. The locking device is provided with a lock mechanism, which includes a lock member that locks the power feeding plug to the inlet, and an operation member, which is operated at least when shifting the lock mechanism to a lock state. The operation member applies an operation force to the lock member to mechanically move the lock member and shift the lock mechanism to a lock state.

20 Claims, 10 Drawing Sheets

LOCKING DEVICE FOR POWER FEEDING PLUG

CROSS-REFERENCE TO RELATED APPLICATIONS

This application is based upon and claims the benefit of priority from prior Japanese Patent Application No. 2010-110563, filed on May 12, 2010, the entire contents of which are incorporated herein by reference.

BACKGROUND OF THE INVENTION

The present invention relates to a locking device that locks a power feeding plug to an inlet of a power feeding connector.

People have become environmentally conscious in recent years. As a result, vehicles with reduced carbon dioxide emissions, such as hybrid vehicles and electric vehicles, have become popular. Such a vehicle uses a battery to power a motor, which produces rotation, and runs mainly using the drive force of the motor. Thus, when the vehicle travels over a long distance, the battery's state of charge becomes low. Whenever the state of charge becomes low, the battery must be charged.

The battery may be charged, for example, at a local charging station. The battery may also be charged using a household charging cable connected to a household outlet. In any case, a power feeding plug, which is connected to a distal end of a charging cable, is used for charging. Japanese Laid-Open Patent Publication No. 9-161898 describes the structure of such a power feeding plug. When the power feeding plug is connected to an inlet of a vehicle, power flows through a cable to the vehicle and charges the battery. The power feeding plug, which also serves as the part of the cable that is grasped, is inserted into the inlet like when refueling a gasoline engine vehicle.

An electrolytic reaction of compounds and ions in battery cells, which form the battery, charges the battery. Thus, the charging time is relatively long. Although fast charging technology is being developed, the time required to charge the battery of an electric vehicle is still long. As a result, until charging is completed, the vehicle may be left unattended over a long period of time with the power feeding plug connected to the inlet of the vehicle. In such a case, someone may wrongfully remove the power feeding plug and connect it another vehicle to steal electricity.

To solve this problem, a locking device is used to lock the power feeding plug to the inlet of the vehicle. This prevents unauthorized removal of the power feeding plug from the power receiving connector. When the locking device is employed, the user's authorization is required to remove the power feeding plug from the inlet. This prevents the power feeding plug from being used to steal electricity.

Japanese Laid-Open Patent Publication Nos. 2009-81917 and 2010-4731 each describe a prior art example of a power feeding plug locking device that cooperates with a vehicle door lock. In these devices, when the vehicle door is locked in a state in which a power feeding plug is connected to the inlet, the locking device switches to a lock state in cooperation with the locking of the door. When the vehicle door is unlocked, the locking device switches to an unlock state in cooperation with the unlocking of the door.

When a battery is charged in a household garage or the like, the charging is performed on private property. In such a case, it would be difficult to steal electricity. Thus, there is no need to lock the power feeding plug when the vehicle doors are locked. However, in a structure in which the power feeding plug locking device cooperates with the door lock, when the doors are locked during charging, the locking device also locks the power feeding plug. Thus, when removing the power feeding plug after charging is completed, the user must operate the unlocking device to unlock the power feeding plug. As a result, the user must be in possession of the vehicle key to unlock the doors. Accordingly, the possession of the vehicle key is necessary and thus burdensome.

SUMMARY OF THE INVENTION

It is an object of the present invention to provide a locking device for a power feeding plug that performs locking as a user desires.

One aspect of the present invention is a locking device for preventing unauthorized removal of a power feeding plug from an inlet. The locking device is provided with a lock mechanism, which includes a lock member that locks the power feeding plug to the inlet, and an operation member, which is arranged in the lock mechanism and operated at least when shifting the lock mechanism to a lock state. The operation member applies an operation force to the lock member to mechanically move the lock member and shift the lock mechanism to a lock state.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE EMBODIMENTS

A locking device for a power feeding plug according to one embodiment of the present invention will now be described with reference to FIGS. 1 to 7.

Figure 1:
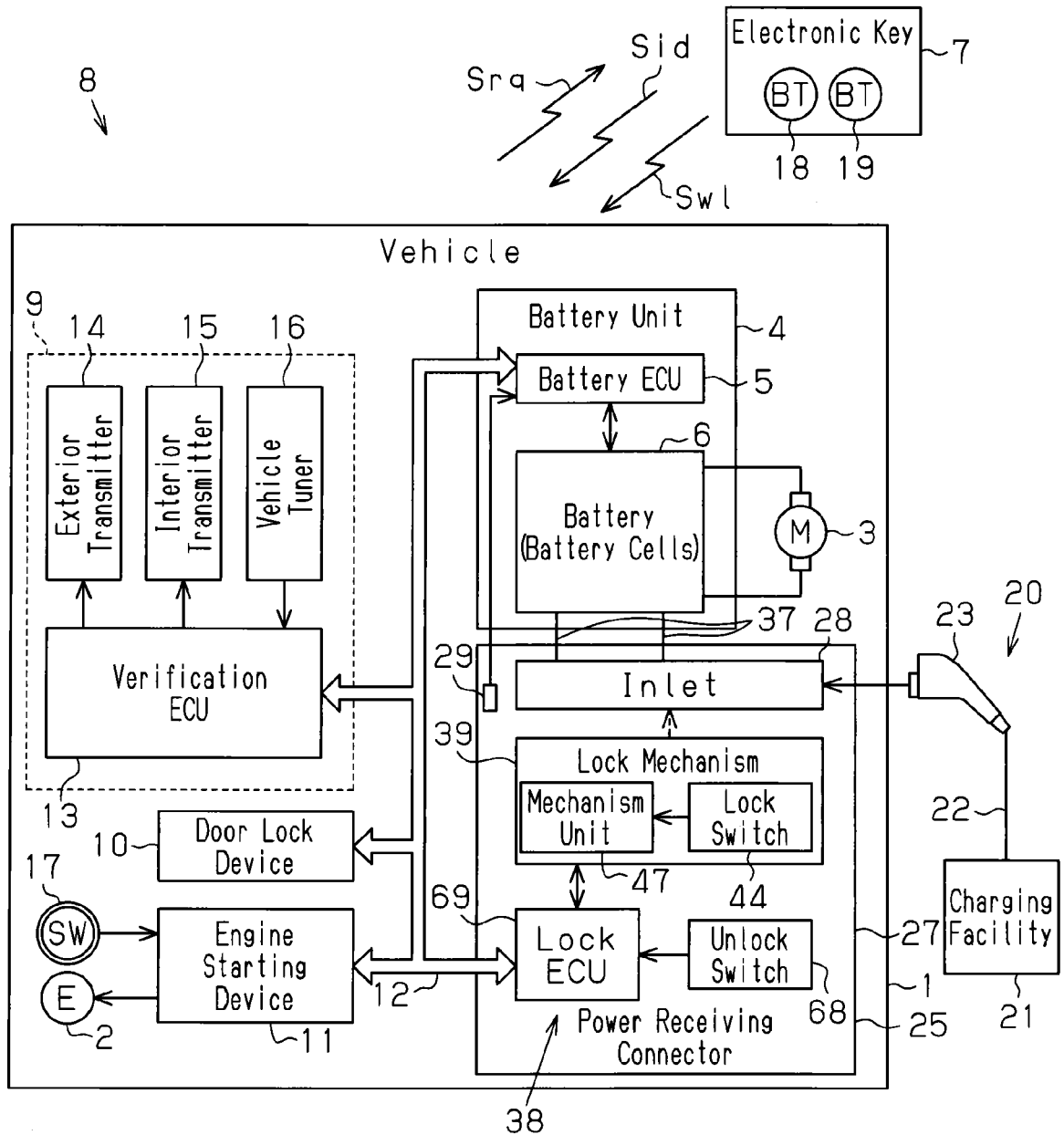
FIG. 1 is a schematic block diagram showing a locking device for a power feeding plug according to one embodiment of the present invention.

Referring to FIG. 1, a hybrid vehicle (hereinafter referred to as the vehicle 1) includes an engine 2 and a motor 3, which serve as power sources for vehicle wheels. The vehicle 1 operates in a mode using only the engine 2 to drive the wheels, a mode using the motor 3 to drive the wheels while generating electric power with the engine 2, a mode using both the engine 2 and the motor 3 to drive the wheels, and a mode using only the motor 3 to drive the wheels.

The vehicle 1 includes a battery unit 4 that supplies the motor 3 with power. The battery unit 4 includes a battery ECU 5, which manages operations of the battery unit 4, and a battery 6, which includes a plurality of battery cells. The battery unit 4 is a single unit, or battery pack, and incorporates the battery ECU 5 and the battery cells (battery 6) in a housing. The motor 3 is connected by a wire to the battery 6 and produces rotation when powered by the battery 6.

An electronic key system 8, which performs key verification with an electronic key 7 through wireless communication, is installed in the vehicle 1. The electronic key system 8 is, for example, a key-operation free system. In a key-operation-free system, the vehicle 1 transmits an inquiry (request signal Srq) to the electronic key 7. In response, the electronic key 7 returns an ID code (ID signal Sid) to the vehicle 1. The vehicle 1 then performs ID verification using the ID code. The electronic key system 8 may also be a wireless key system that remotely controls in-vehicle devices by the operation of buttons on the electronic key 7.

The vehicle 1 includes a key verification device 9, a door lock device 10, and an engine starting device 11, which are connected to one another by an in-vehicle bus 12. The key verification device 9 performs ID verification with the electronic key 7. The door lock device 10 manages door lock operations. The engine starting device 11 manages operations of the engine 2. The key verification device 9 includes a verification electronic control unit (ECU) 13, which controls the key verification device 9. The verification ECU 13 includes a memory (not shown), which registers an ID code of the electronic key 7 that corresponds to the vehicle 1.

The verification ECU 13 is connected to an exterior transmitter 14, an interior transmitter 15, and a vehicle tuner 16. The exterior transmitter 14 transmits a low frequency (LF) radio wave outside the vehicle 1. The interior transmitter 15 transmits an LF radio wave inside the vehicle 1. The vehicle tuner 16 receives an ultrahigh frequency (UHF) radio wave. The exterior transmitter 14 and the interior transmitter 15 transmit a request signal Srq, which is an ID return request, on an LF radio wave to attempt smart communication.

The verification ECU 13 receives an ID signal Sid from the electronic key 7 in response to the request signal Srq and performs ID verification, or smart verification. When smart verification with the electronic key 7 outside the vehicle 1, namely, exterior verification, is accomplished, the verification ECU 13 permits or performs locking/unlocking of the doors with the door lock device 10. When smart verification with the electronic key 7 inside the vehicle 1, namely, interior verification, is accomplished, the verification ECU 13 permits the starting of the engine and power activation when an engine switch 17 is pushed.

The electronic key 7 includes a lock button 18 and an unlock button 19, which are operated to remotely lock and unlock the doors. When the lock button 18 or unlock button 19 is operated, the electronic key 7 transmits a corresponding wireless signal Swl. The vehicle 1 receives the wireless signal Swl and performs ID verification with an ID code that is included in the wireless signal Swl. When ID verification is accomplished, the vehicle 1 performs an operation that is in accordance with the content of the wireless signal Swl.

Figure 2:
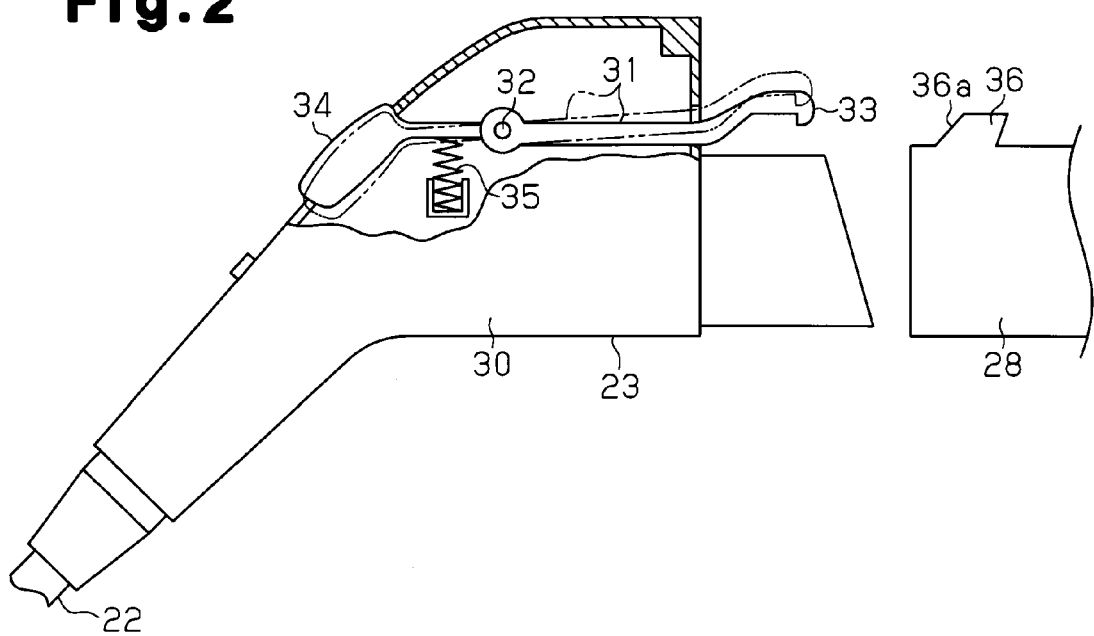
FIG. 2 is a side view, partly in cross section, showing the power feeding plug prior to connection to an inlet.
Figure 3:
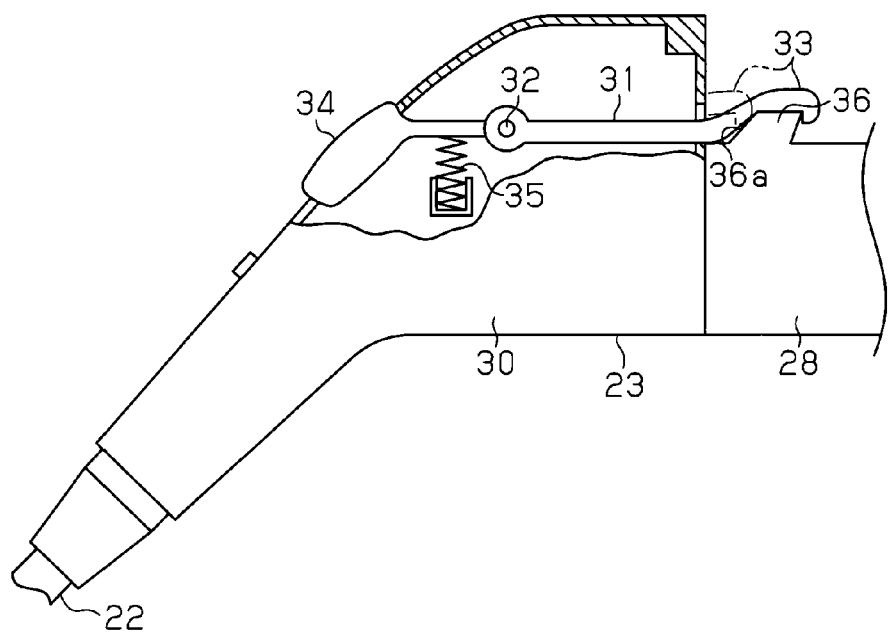
FIG. 3 is a side view, partly in cross section, showing the power feeding plug connected to the inlet.
Figure 4:
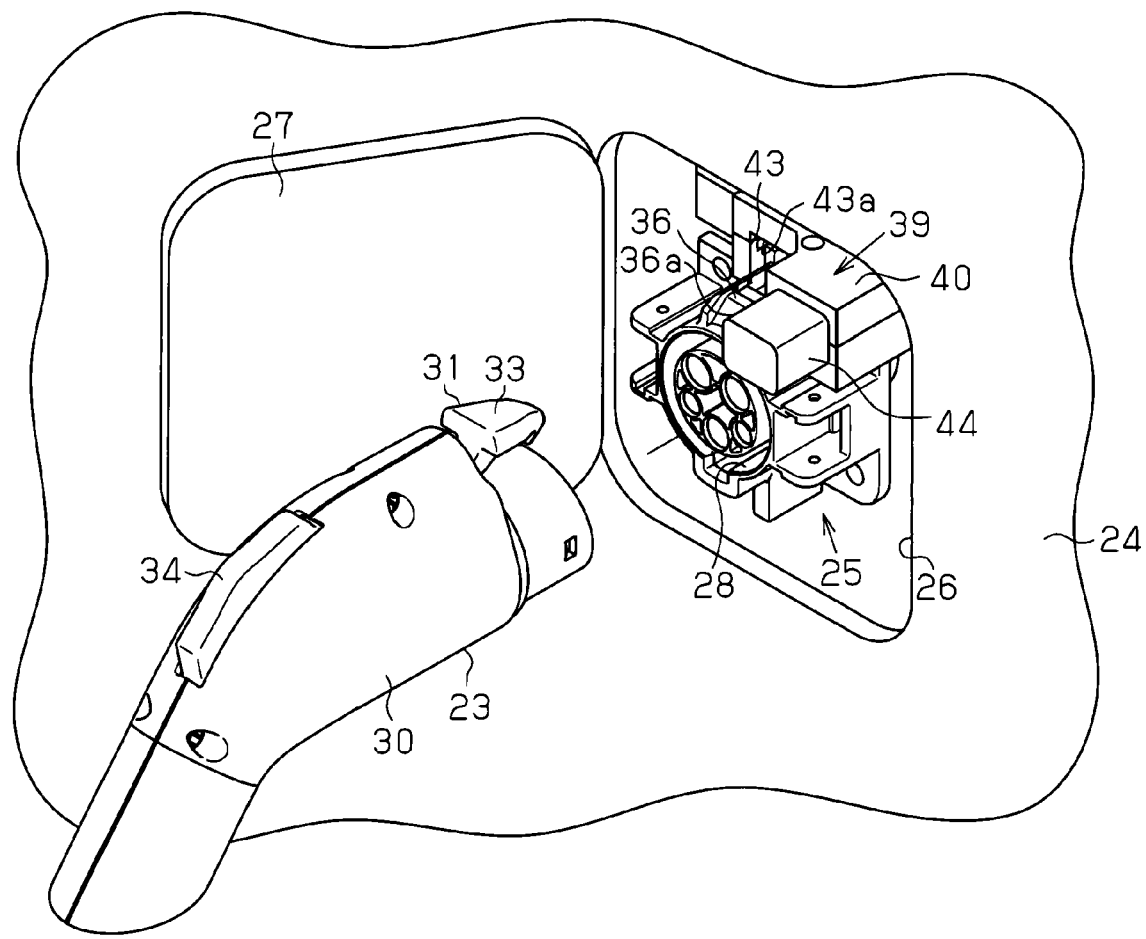
FIG. 4 is a perspective view showing a power receiving connector including the inlet.
Figure 5:
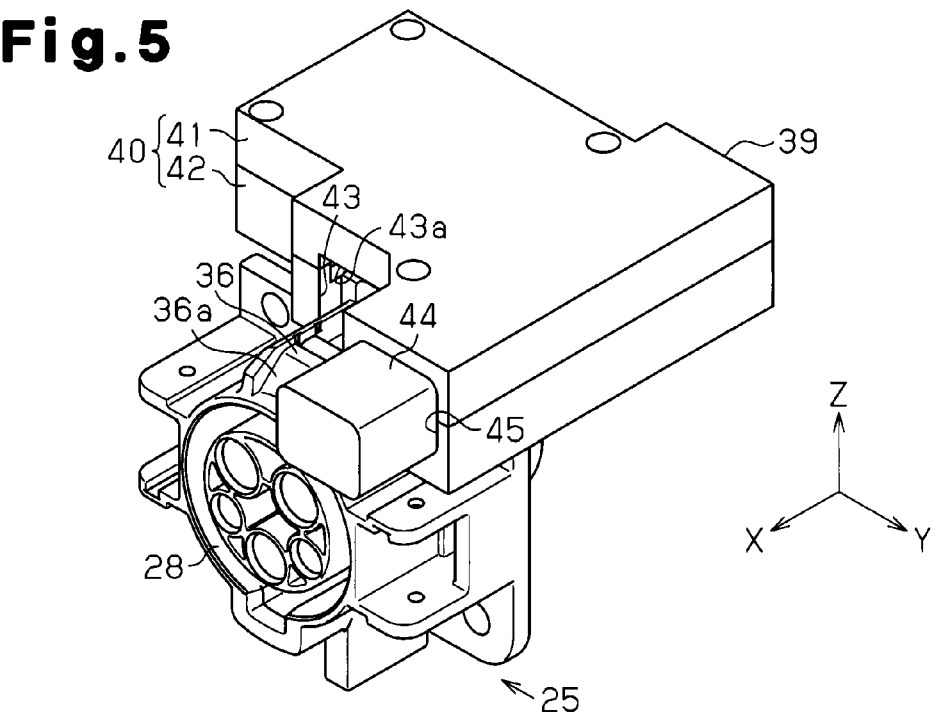
FIG. 5 is a perspective view showing a lock mechanism and the inlet.

The vehicle 1 further includes a charging system 20 that charges the battery 6. The battery 6 may be charged at a charging facility 21, which may be a local charging station or a household outlet of a commercial power supply. A charging cable 22, which is arranged in the charging facility 21, is connected to the vehicle 1 to charge the battery 6. As shown in FIGS. 2 to 4, the charging cable 22 includes a distal end to which a power feeding plug 23 is coupled. The power feeding plug 23 is a power supply side component of the charging system and has the shape of a nozzle.

Referring to FIGS. 1 to 4, the power feeding plug 23 is connectable to a power receiving connector 25, which is arranged, for example, in a left front wall of a vehicle body (refer to FIG. 4). The power receiving connector 25 includes an accommodation compartment 26 (refer to FIG. 4), which is closed by a lid 27. An inlet 28 is arranged in the power receiving connector 25. Electrical terminals of the power feeding plug 23 are connectable to the inlet 28. As shown in FIG. 1, the inlet 28 includes a plug connection detection sensor 29, which detects complete insertion of the power feeding plug 23.

As shown in FIGS. 2 to 4, the power feeding plug 23 includes a plug body 30. A lock arm 31 is pivotally coupled to the plug body 30 to prevent removal of the power feeding plug 23 from the inlet 28. The lock arm 31 includes a shaft 32, which extends perpendicular to an insertion direction (X axis direction as shown in FIG. 2) of the power feeding plug 23. Further, the lock arm 31 includes a distal end, which forms a hook 33, and a basal end, which forms an operation portion 34. The hook 33 and the operation portion 34 are exposed from the plug body 30. An urging member 35, which urges the lock arm 31 toward a close position, is coupled to the lock arm 31 near the operation portion 34.

When connecting the power feeding plug 23 to the power receiving connector 25, the power feeding plug 23 is inserted straight into the power receiving connector 25. As shown by the broken lines in FIG. 3, the lock arm 31 is forced against an inclined surface 36a of a projection 36, which projects from an upper wall of the inlet 28. This moves the hook 33 along the inclined surface 36a. That is, the lock arm 31 is pivoted toward an open position. Then, as shown by the solid lines in FIG. 3, when the hook 33 moves beyond the inclined surface 36a and the power feeding plug 23 is completely inserted into the inlet 28, the urging force of the urging member 35 pivots the lock arm 31 downward toward the close position. This engages the hook 33 with the projection 36 and prevents removal of the power feeding plug 23 from the inlet 28.

When the battery ECU 5 determines with the plug connection detection sensor 29 that the power feeding plug 23 has been completely inserted into the inlet 28, the battery ECU 5 sends an inquiry to the verification ECU 13 on the ID verification result. When ID verification has not been accomplished, the verification ECU 13 retries smart verification. When ID verification has been accomplished, the battery ECU 5 permits the flow of current from the power feeding plug 23 to the battery 6 by activating a switch (not shown) arranged in a current path of the battery 6. The battery 6 is charged when current flows to the battery 6 from the power feeding plug 23 via the inlet 28 and power lines 37.

After charging is completed, to remove the power feeding plug 23 from the inlet 28, the operation portion 34 of the lock arm 31 is pressed down to pivot the lock arm 31 toward the open position. This disengages the hook 33 from the projection 36. In this state, the power feeding plug 23 is removed from the inlet 28 by pulling the power feeding plug 23.

As shown in FIG. 1, the power receiving connector 25 includes a locking device 38 that prevents unauthorized removal of the power feeding plug 23 from the inlet 28. In the present embodiment, as shown in FIGS. 5 to 8, the locking device 38 includes a lock mechanism 39 arranged above the inlet 28. The lock mechanism 39 includes a case 40, which accommodates various components of the lock mechanism 39. The case 40 is formed by coupling an upper housing 41 and a lower housing 42 to each other. The case 40 includes a cavity 43 that receives the lock arm 31 when the lock arm 31 is engaged with and disengaged from the projection 36.

A bar-shaped lock switch 44 is arranged in the case 40. The lock switch 44 is linearly movable back and forth in the insertion direction X (X axis direction in FIG. 7) of the power feeding plug 23. The lock switch 44 is operated to lock the lock mechanism 39. Further, the lock switch 44 is accommodated in a switch retainer 45, which is formed near one side (right side as viewed in FIG. 7) of the case 40 relative to a lateral direction Y (Y axis direction of FIG. 7) of the locking device 38. A first urging member 46 is arranged between a rear surface of the lock switch 44 and an opposing wall of the switch retainer 45 to urge the lock switch 44 toward the front. The first urging member 46 is, for example, a coil spring. The lock switch 44 is one example of an operation member.

A mechanism unit 47, which includes mechanical components of the lock mechanism 39, is arranged in the case 40. In the present embodiment, the mechanism unit 47 includes an elongated lock bar 48, which is arranged in the case 40 to be linearly movable back and forth in the lateral direction Y to restrict opening of the lock arm 31. The lock bar 48 moves into and out of the case 40 through an opening 49, which extends in the lateral direction Y through a side wall defining the cavity 43. The lock bar 48 has a basal portion that is arranged in an accommodation recess 50 (refer to FIG. 9), which is formed in the side wall of the lock switch 44. The lock bar 48 is one example of a lock member.

As shown in FIGS. 9 to 12, an inclined surface 51 is formed in one corner of a basal end of the lock bar 48. The accommodation recess 50 includes a wall defining an engagement portion 52, which comes into contact with the inclined surface 51. The surface of the engagement portion 52 that comes into planar contact with the inclined surface 51 defines an inclined surface 53. When force is applied to the lock switch 44, the inclined surfaces 51 and 53 convert linear movement of the lock switch 44 in the insertion direction X to linear movement of the lock bar 48 in the lateral direction Y. The inclined surfaces 51 and 53 implement a wedge effect to mechanically convert the operation force of the lock switch 44 from the insertion direction X to a direction that differs by approximately 90 degrees, namely, the lateral direction Y, to move the lock bar 48 back and forth in the lateral direction Y.

A plate-shaped seat 54 extends from the basal end of the lock bar 48 in the insertion direction X. The seat 54 includes a projection. A second urging member 56 is arranged between the projection of the seat 54 and an opposing support wall 55 of the case 40. The second urging member 56 urges the lock bar 48 into the accommodation recess 50. The second urging member 56 is, for example, a coil spring.

When the lock switch 44 is pushed in a state in which the hook 33 of the lock arm 31 is engaged with the projection 36 of the power receiving connector 25, the inclined surface 53 of the lock switch 44 pushes the inclined surface 51 of the lock bar 48. This moves the lock bar 48 out of the accommodation recess 50 through the opening 49. In this state, the lock bar 48 holds the hook 33 from above, and the lock mechanism 39 is in a lock state. When the urging force of the first urging member 46 returns the lock switch 44 to a state projected out of the switch retainer 45, the urging force of the second urging member 56 returns the lock bar 48 into the accommodation recess 50 through the opening 49. In this state, the lock mechanism 39 is in an unlock state.

Figure 7:
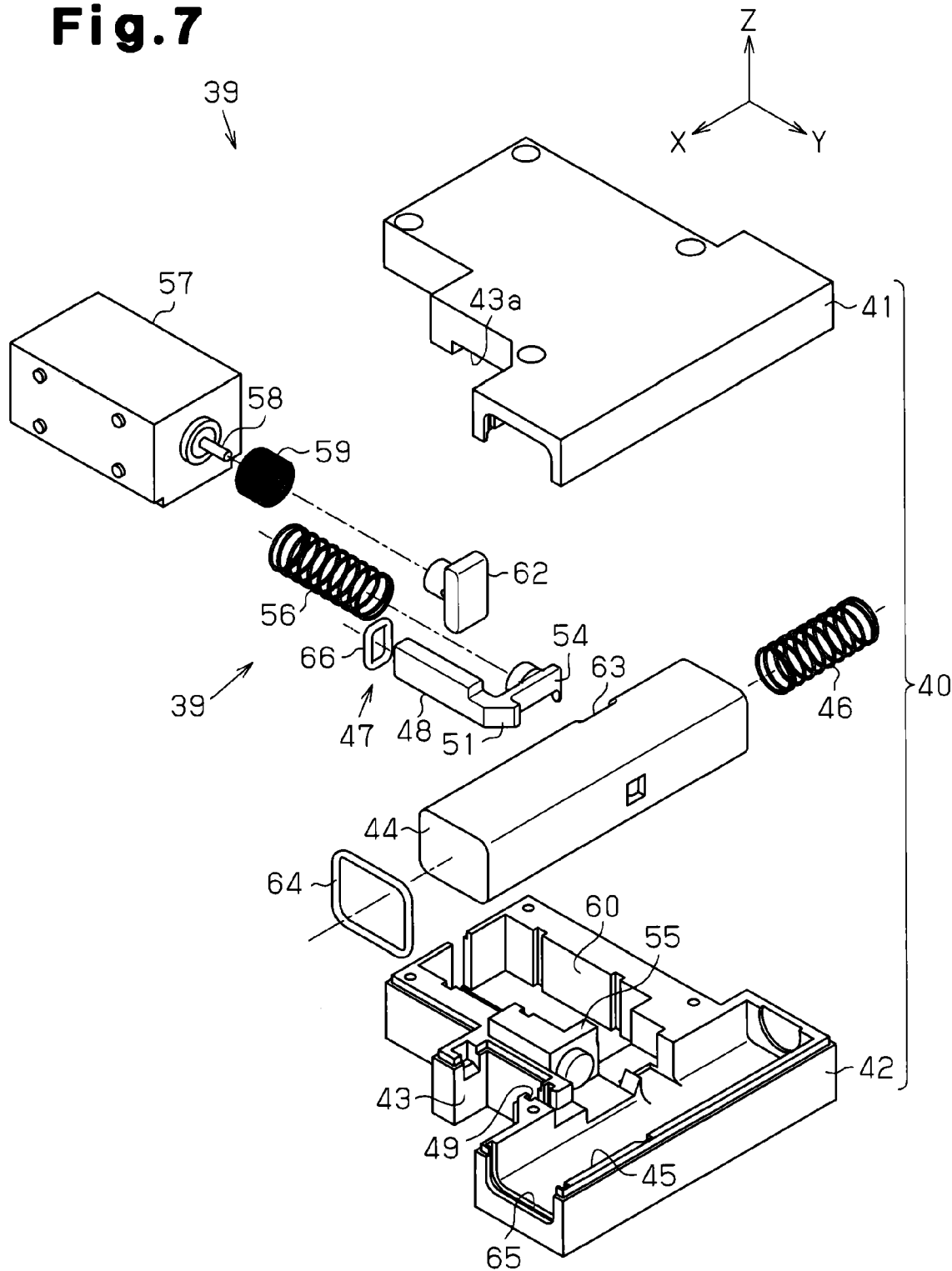
FIG. 7 is an exploded perspective view showing the structure of the lock mechanism.
Figure 8:
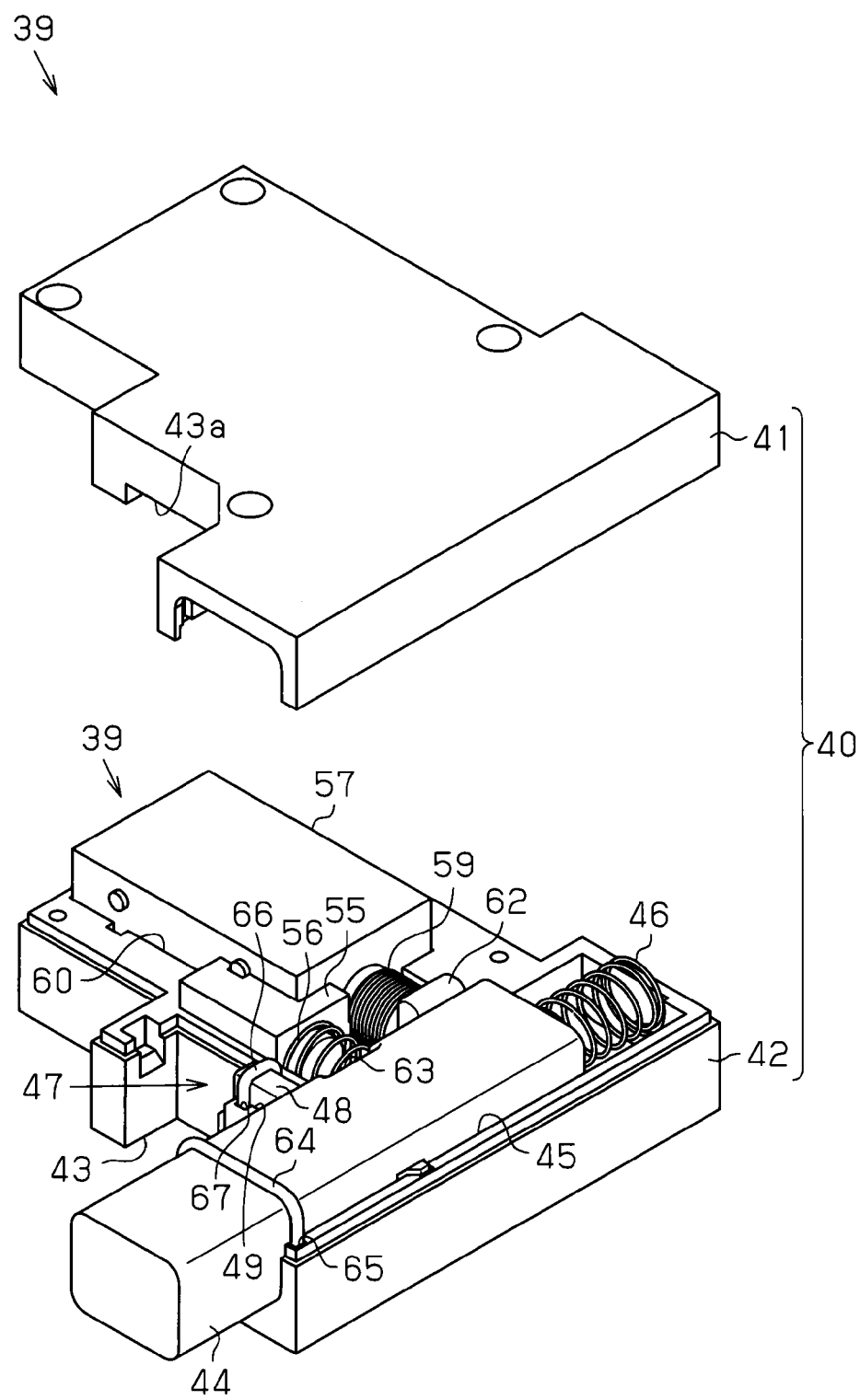
FIG. 8 is an exploded perspective view showing the interior of the lock mechanism by removing an upper housing.

As shown in FIGS. 7 and 8, a solenoid 57, which serves as an actuator, is arranged in the case 40 to keep the lock switch 44 in a state retracted into the switch retainer 45, that is, to keep the lock mechanism 39 in the lock state. The solenoid 57, which includes a plunger 58, is a retraction solenoid that retracts the plunger 58 into the solenoid body when energized. When the solenoid 57 is not energized, a third urging member 59, which is attached to the plunger 58, projects the plunger 58 out of the solenoid body. The solenoid 57 is accommodated in a solenoid retainer 60, which is formed in the case 40, and arranged extending in the lateral direction Y. The third urging member 59 is, for example, a coil spring.

An engagement tab 62, which is engageable with the lock switch 44, is formed on a distal end of the plunger 58. The engagement tab 62 is plate-shaped and larger than the diameter of the plunger 58. An engagement groove 63, which engages the engagement tab 62 of the plunger 58, is formed in the middle part of a side wall of the lock switch 44. In this example, the solenoid 57, the plunger 58, the third urging member 59, the engagement tab 62, and the engagement groove 63 form a lock state holding unit.

When the lock switch 44 is pushed and the engagement groove 63 of the lock switch 44 reaches the engagement tab 62 on the plunger 58 of the inactivated solenoid 57, the urging force of the third urging member 59 projects the plunger 58. This engages the engagement tab 62 with the engagement groove 63. As a result, the lock switch 44 is held in the retracted state. That is, the lock mechanism 39 is held in the lock state. When the lock mechanism 39 is in the lock state, the solenoid 57 is energized to retract the plunger 58 into the solenoid body. This moves the engagement tab 62 from the engagement groove 63. As a result, the urging force of the first urging member 46 forces and projects the lock switch 44 out of the switch retainer 45. This shifts the lock mechanism 39 to the unlock state.

The cavity 43 includes an upper wall that defines a support surface 43a, which supports the lock bar 48 from above. When the lock bar 48 holds the hook 33 from above, that is, when the lock mechanism 39 is in a lock state, the support surface 43a supports the lock bar 48 from above. This prevents unauthorized removal of the lock bar 48.

A first seal 64 is arranged near the open edge of the switch retainer 45 to seal a gap between the lock switch 44 and the open edge of the switch retainer 45. The first seal 64 is a packing, for example, an O-ring. Instead of the O-ring, a square ring may be used for the first seal 64. A seal groove 65, which is formed in the inner wall of the switch retainer 45, receives the first seal 64. The first seal 64 prevents fluid, such as water, from entering the case 40. The first seal 64 corresponds to a seal member. The open edge of the switch retainer 45 corresponds to a coupling location of the lock switch 44 (operation member).

Further, a second seal 66 is arranged in the case 40 to prevent water from entering the case 40 through a gap between the lock bar 48 and the opening 49. The second seal 66 is also a packing, for example, an O-ring. Instead of the O-ring, a square ring may be used for the second seal 66. A seal groove 67, which is formed in the inner wall of the case 40 edge of the opening 49, receives the second seal 66. The opening 49 of the case 40 corresponds to a coupling location of the lock bar 48 (lock member).

Figure 6:
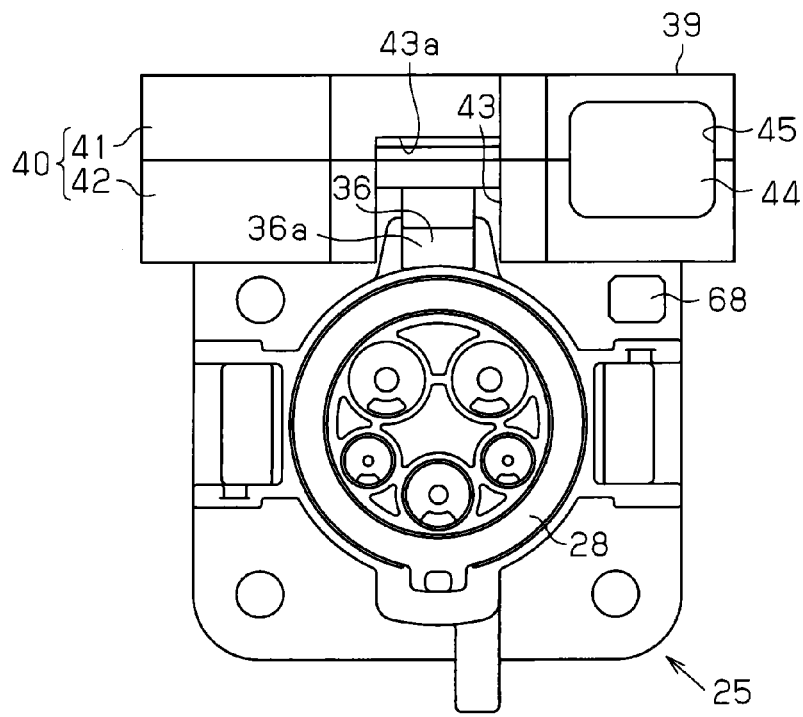
FIG. 6 is a front view showing the lock mechanism and the inlet.

Referring to FIGS. 1 and 6, an unlock switch 68, which is operated to unlock the lock mechanism 39, is arranged below the lock switch 44 on a front surface of the power receiving connector 25. The unlock switch 68 is, for example, a push-operation type momentary switch. When the unlock switch 68 is pushed, the unlock switch 68 outputs an on signal.

As shown in FIG. 1, the power receiving connector 25 includes a lock ECU 69, which controls the operation of the locking device 38. The lock ECU 69 is connected to the in-vehicle bus 12 to exchange various types of information with other ECUs and devices. Further, the lock ECU 69 is connected to the solenoid 57 and the unlock switch 68. When determining that the unlock switch 68 has been operated, the lock ECU 69 checks with the door lock device 10 to determine whether or not the doors of the vehicle 1 are unlocked. When the doors are unlocked, the lock ECU 69 energizes the solenoid 57 for a certain period to unlock the lock mechanism 39. In this example, the unlock switch 68 corresponds to an unlock member, and the unlock switch 68 and lock ECU 69 correspond to an unlock unit.

The operation of the locking device 38 will now be described with reference to FIGS. 9 to 12.

Figure 9:
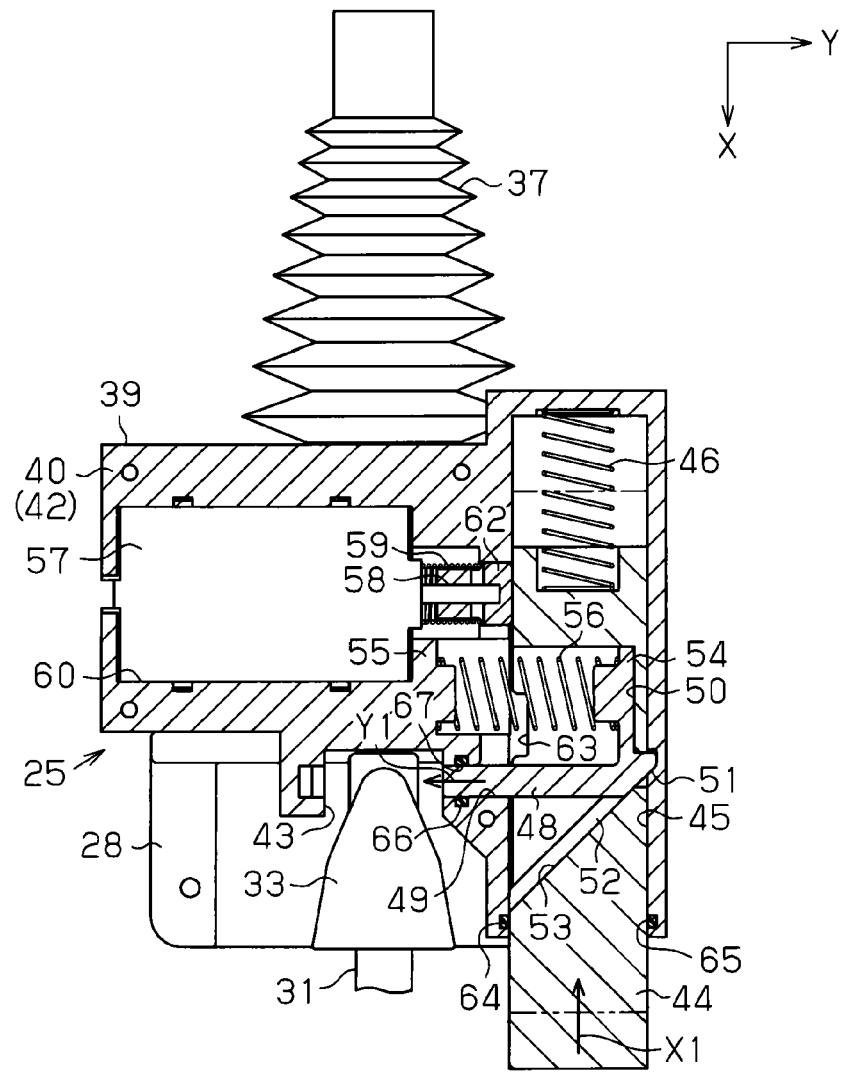
FIG. 9 is a cross-sectional view showing the lock mechanism in an unlock state.
Figure 10:
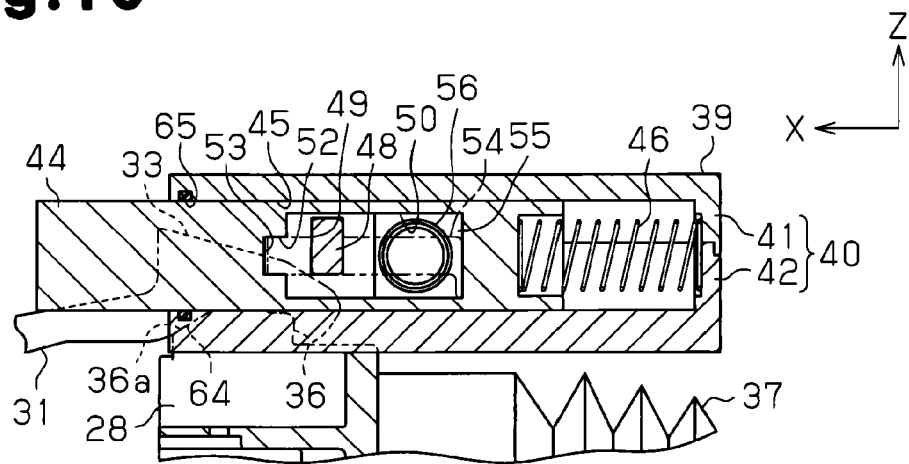
FIG. 10 is a cross-sectional view showing the lock mechanism in an unlock state.

As shown in FIGS. 9 and 10, when the locking device 38 is in an unlock state, the first urging member 46 projects the lock switch 44 out of the switch retainer 45 to an outermost position. In this state, the lock bar 48 is moved in a direction opposite to the arrow Y1 by the urging force of the second urging member 56 and retracted into the accommodation recess 50 through the opening 49. In this state, the lock bar 48 does not interfere with the hook 33 of the lock arm 31 from above. Thus, the lock mechanism 39 is in an unlock state, and the power feeding plug 23 can be connected to the power receiving connector 25.

After connecting the power feeding plug 23 to the power receiving connector 25, the lock switch 44 can be manually pushed against the urging force of the first urging member 46 in the X1 direction as shown by the broken lines in FIG. 9 to shift the locking device 38 to a lock state. When linearly moving the lock switch 44 in the X1 direction, the inclined surface 53 of the lock switch 44 produces a wedge effect that pushes the inclined surface 51 of the lock bar 48. This linearly moves the lock bar 48 in the Y1 direction of FIG. 9 against the urging force of the second urging member 56.

Figure 11:
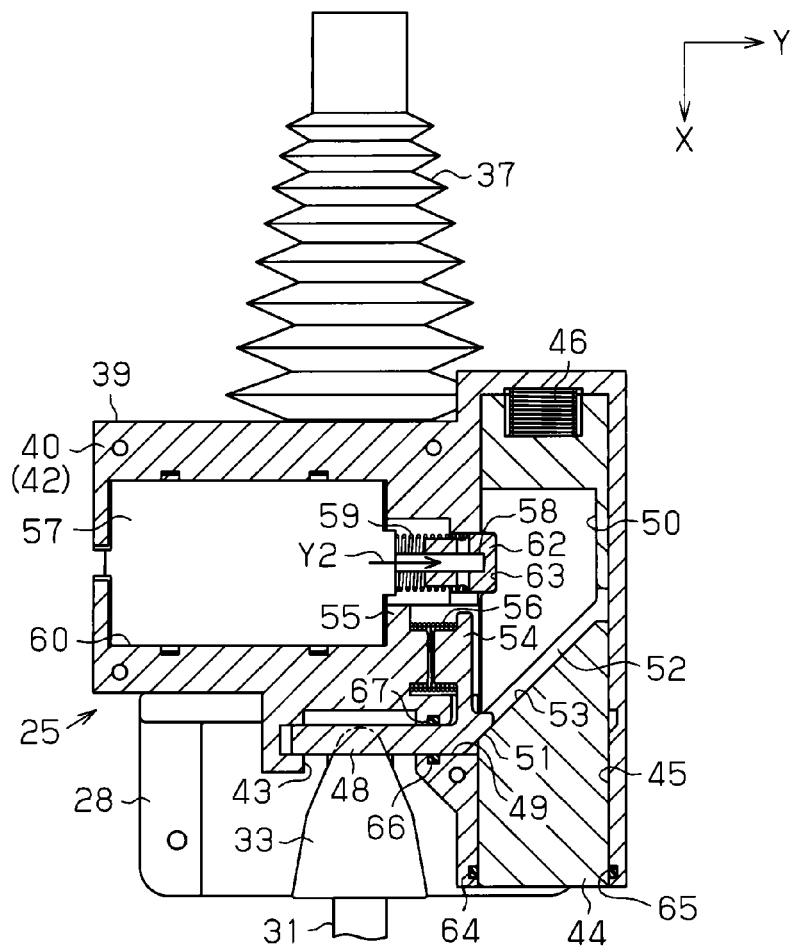
FIG. 11 is a cross-sectional view showing the lock mechanism in a lock state.
Figure 12:
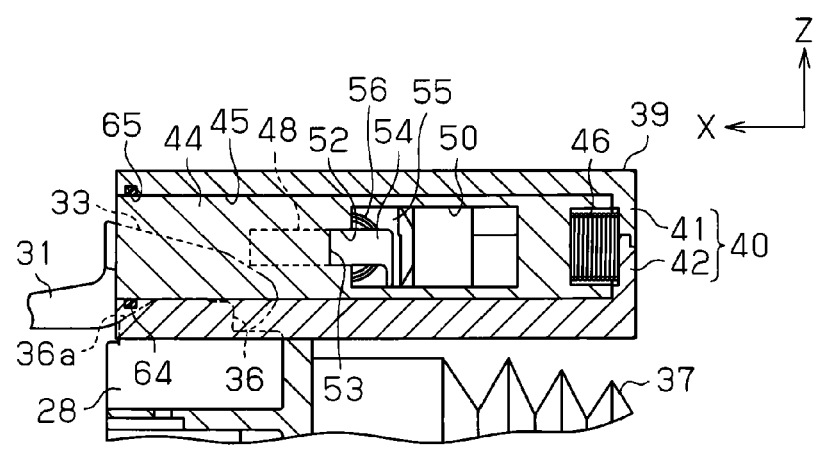
FIG. 12 is a cross-sectional view showing the lock mechanism in a lock state.

Referring to FIGS. 11 and 12, when the lock switch 44 is manually pushed to an innermost position and the lock bar 48 is arranged above the hook 33 of the lock arm 31, the lock bar 48 blocks the hook 33 from above. This prohibits opening of the lock arm 31. Thus, the power feeding plug 23 cannot be removed from the power receiving connector 25.

Further, when the lock switch 44 is pushed to the innermost position, the engagement groove 63 of the lock switch 44 faces toward the engagement tab 62 of the plunger 58. In this state, the urging force of the third urging member 59 projects the plunger 58 in the Y2 direction as shown by FIG. 11, and the engagement tab 62 engages the engagement groove 63. This holds the lock switch 44 at the innermost position and the lock bar 48 above the hook 33. Thus, the lock mechanism 39 is in the lock state, and removal of the power feeding plug 23 is prevented.

To shift the locking device 38 to an unlock state, the unlock switch 68 is pushed. When determining that the unlock switch 68 has been operated, the lock ECU 69 checks with the door lock device 10 to determine whether or not the doors of the vehicle 1 have been unlocked through smart communication or wireless communication. When the doors have been unlocked, the lock ECU 69 starts to perform an unlocking operation on the locking device 38. That is, the lock ECU 69 performs the unlocking operation under the condition that the unlock switch 68 has been operated and the doors have been unlocked.

Figure 13:
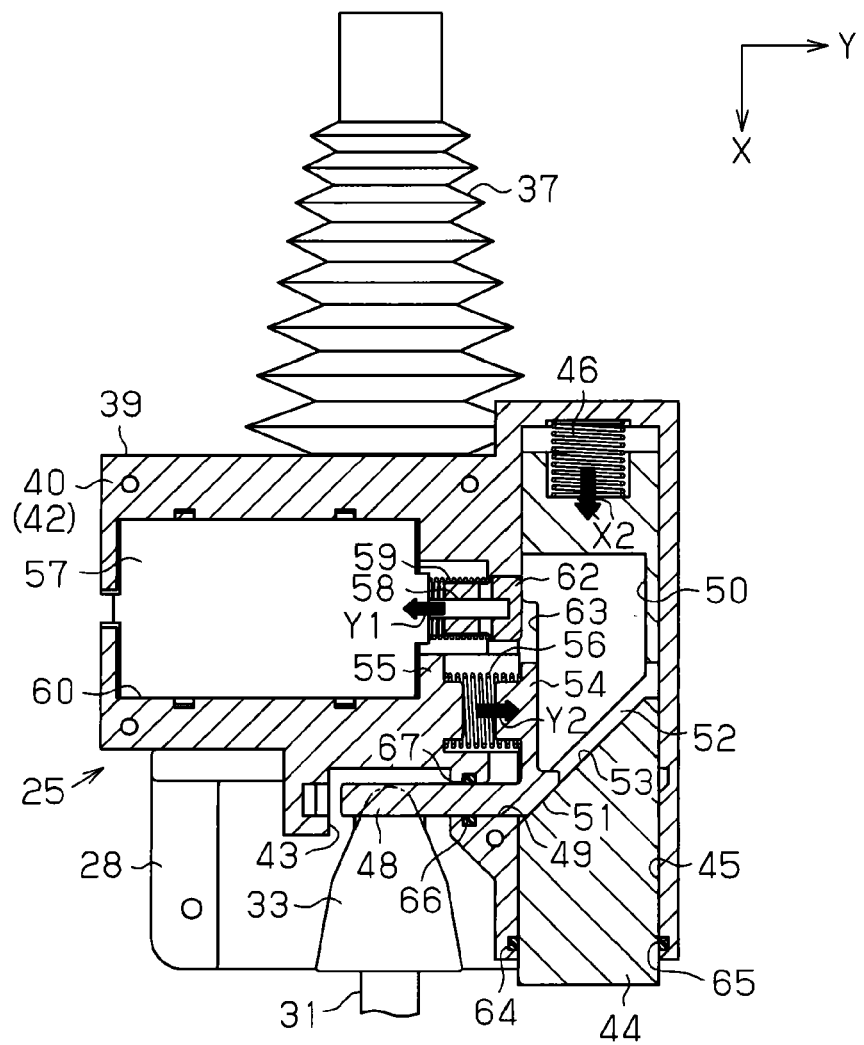
FIG. 13 is a cross-sectional view showing the lock mechanism when shifting from a lock state to an unlock state.
Figure 14:
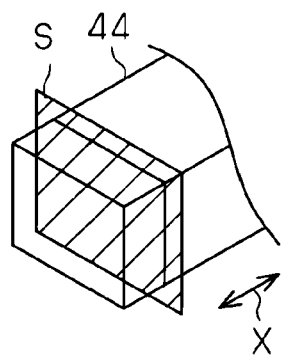
FIG. 14 is a schematic diagram showing the operation of the lock mechanism in the present example.

In this case, the lock ECU 69 energizes the solenoid 57 for a certain time. Thus, as shown in FIG. 13, the plunger 58 is retracted in the Y1 direction as shown in FIG. 13 against the urging force of the third urging member 59. This moves the engagement tab 62 of the plunger 58 away from the engagement groove 63 of the lock switch 44. When the engagement tab 62 is disengaged from the engagement groove 63, the urging force of the first urging member 46 linearly moves the lock switch 44 in the X2 direction of FIG. 13.

As the lock switch 44 linearly moves in the X2 direction, the inclined surface 53 of the lock switch 44 also moves in the X2 direction. The urging force of the second urging member 56 then slides the inclined surface 51 of the lock bar 48 along the inclined surface 53 of the lock switch 44. As a result, the lock bar 48 is linearly moved in the Y2 direction as shown in FIG. 13. This moves the lock bar 48 away from the hook 33 of the lock arm 31. As a result, the lock mechanism 39 is shifted to an unlock state and thereby permits removal of the power feeding plug 23 from the power receiving connector 25.

As described above, in the present example, the lock switch 44, which is operated to shift the locking device 38 to a lock state, is arranged in the power receiving connector 25. Thus, the locking operation of the locking device 38 is performed in cooperation with the lock switch 44 and not in cooperation with the locking of the vehicle doors. Thus, the user may perform the locking operation of the locking device 38 as desired by operating the lock switch 44. This satisfies the demand of a user that wishes to lock the doors but leave the locking device 38 for the power feeding plug 23 in an unlock state when charging the battery 6 of the vehicle 1.

The locking device 38 of the present embodiment has the advantages described below.

(1) The power receiving connector 25 includes the lock switch 44. When the lock switch 44 is operated, the lock mechanism 39 mechanically starts the locking in cooperation with the lock switch 44 and shifts the locking device 38 to the lock state. Thus, the locking operation of the locking device 38 is not performed in cooperation with the locking of the doors. Accordingly, the user can perform a locking operation with the locking device 38 by operating the lock switch 44.

(2) The first seal 64 is arranged between the lock switch 44 and the switch retainer 45. Thus, fluid such as water is prevented from entering the locking device 38 through the gap formed around the lock switch 44. This ensures that the locking device 38 is waterproof.

(3) When the lock switch 44 is pushed, the engagement tab 62 at the distal end of the plunger 58 of the solenoid 57 engages with the engagement groove 63 of the lock switch 44 and shifts the locking device 38 to a lock state. Thus, the locking device 38 is kept in the lock state with a simple structure in which the engagement tab 62 is engaged with the engagement groove 63.

(4) When the solenoid 57 is energized and the plunger 58 is retracted, the locking device 38 shifts to the unlock state. If the vehicle doors are unlocked when the unlock switch 68 is operated, that is, when the unlocking conditions are not satisfied, the solenoid 57 is not energized. This holds the locking device 38 in the lock state. Thus, when the locking device 38 is held in the lock state, the solenoid 57 does not have to be supplied with power.

(5) The lock switch 44 is discrete from the unlock switch 68. This prevents operation errors when switching the locking device 38 to the lock state or unlock state.

(6) The hook 33 of the lock arm 31 functions to prevent removal of the power feeding plug 23. When the lock bar 48 of the power receiving connector 25 is arranged above the hook 33, the locking device 38 is in the lock state. Thus, the locking device 38 is realized with a simple structure in which the lock bar 48 blocks movement of the hook 33 from above.

(7) The second seal 66 is arranged between the lock bar 48 and the opening 49. Thus, fluid such as water is prevented from entering the locking device 38 through the gap formed around the lock bar 48. This ensures that the locking device 38 is waterproof.

(8) The lock switch 44 is of a push-operation type, and the movement direction of the lock switch 44 (X axis direction) is orthogonal to a plane S on which the first seal 64 lies. Thus, the movement direction of the lock switch 44 does not affect the first seal 64. That is, the setting of the first seal 64 is easy. Accordingly, the first seal 64 for the lock switch 44 has a simple structure. The same applies to the second seal 66.

(9) The movement direction of the lock switch 44 (the X axis direction in FIG. 9) is perpendicular to the movement direction of the lock bar 48 (Y axis direction in FIG. 9). Thus, the direction in which the power feeding plug 23 is inserted into the power receiving connector 25 is the same as the pushing direction of the lock switch 44. The operations for inserting the power feeding plug 23 into the power receiving connector 25 and pushing the lock switch 44 are performed in series without greatly changing the operation positions.

(10) The locking device 38 shifts to the unlock state when the unlock switch 68 is operated and the vehicle doors are unlocked. In this manner, to shift the locking device 38 to the unlock state, the doors must be unlocked with the authentic electronic key 7 (mechanical key may also be used). This prevents unauthorized unlocking of the locking device 38.

(11) The lock switch 44 is operated to switch the locking device 38 to the lock state. Thus, anyone can lock the locking device 38 by pushing the lock switch 44.

It should be apparent to those skilled in the art that the present invention may be embodied in many other specific forms without departing from the spirit or scope of the invention. Particularly, it should be understood that the present invention may be embodied in the following forms.

Figure 15:
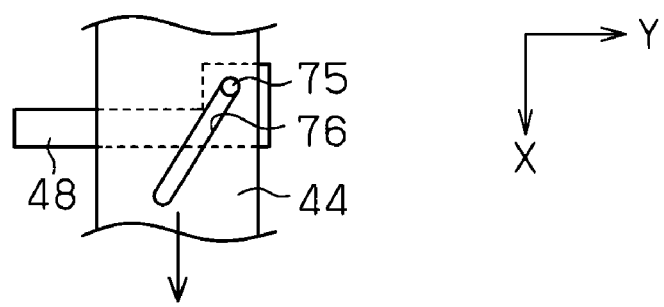
FIG. 15 is a schematic diagram showing the structure of a further example of a lock mechanism.

The mechanical lock mechanism 39 may be modified as shown in FIG. 15. In FIG. 15, an engagement pin 75 is arranged at the basal end of the lock bar 48. The lock switch 44 includes a diagonal elongated hole 76 engaged with the engagement pin 75. In this case, the engagement pin 75 and the elongated hole 76 convert the operation force in the insertion direction of the lock switch 44 (X axis direction) into movement force of the lock bar 48 in the lateral direction (Y axis direction). The employment of this structure eliminates the second urging member 56 for the lock bar 48. This reduces the number of components.

The seals 64 and 65 are not limited to O-rings or square rings and may be a different type of packing.

The lock bar 48 does not have to be bar-shaped and may have other shapes, such as a plate-like shape or sector-shaped.

The solenoid 57 is not restricted to a retraction type and may be of another type. Further, the actuator is not limited to the solenoid 57 and may be, for example, a motor.

The lock switch 44 and the lock bar 48 do not have to be arranged next to each other in the lateral direction (Y axis direction) and may be arranged next to each other in, for example, the vertical direction (Z axis direction).

The urging members 46, 56, and 59 are not limited to coil springs and may be other types of springs.

The unlocking of the locking device 38 does not have to be performed under the condition that the unlock switch 68 is operated. The unlock switch 68 may be eliminated, and the unlocking of the locking device 38 may be performed, for example, only under the condition that the doors are unlocked.

The lock switch 44 does not have to be of an alternator type as in the embodiment described above and may be of, for example, a momentary type.

The lock switch 44 does not have to be a switch used for locking and may be, for example, a switch used for unlocking. In this case, the locking device 38 is alternately switched between a lock state and an unlock state whenever the switch is operated.

The lock mechanism 39 does not have to lock the hook 33 of the lock arm 31 by blocking the hook 33 from above with the lock bar 48 of the power receiving connector 25. For example, a pin may be engaged with the power feeding plug 23 to fix the power feeding plug 23 to the inlet 28.

The lock switch 44 is not limited to a pushing type and may be, for example, a rotary type that rotates a knob or a tilting type that tilts a lever.

The unlock switch 68 does not have to be arranged in the inlet 28 and may be arranged in the locking device 38 (case 40).

The lock arm 31 may be arranged upside down from the state of the embodiment described above.

The vehicle 1 is not limited to a hybrid vehicle and may be, for example, an electric vehicle.

The present examples and embodiments are to be considered as illustrative and not restrictive, and the invention is not to be limited to the details given herein, but may be modified within the scope and equivalence of the appended claims.

The invention claimed is:

1. A locking device for preventing unauthorized removal of a power feeding plug from an inlet, wherein the power feeding plug includes a lock arm that is pivotally coupled to the power feeding plug and engageable with the inlet, the locking device comprising:
    a lock mechanism including a lock member that is movable relative to the lock arm engaged with the inlet, wherein the lock member locks the power feeding plug to the inlet by restricting pivoting of the lock arm; and
    an operation member arranged in the lock mechanism and operated at least when shifting the lock mechanism to a lock state, wherein the operation member applies an operation force to the lock mechanism to mechanically move the lock member to a position where the pivoting of the lock arm is restricted and shift the lock mechanism to a lock state.

2. The locking device according to claim 1, further comprising a seal arranged between the operation member and a location to which the operation member is coupled, wherein the seal prevents fluid from entering the lock mechanism.

3. The locking device according to claim 1, further comprising a lock state holding unit that mechanically cooperates with the operation member, when operated, to hold the operation member at a location that keeps the lock mechanism in the lock state.

4. The locking device according to claim 1, further comprising:
    an actuator that moves the lock member to a lock position to hold the lock mechanism in the lock state;

an unlock unit that operates the actuator to return the lock member from the lock position to an unlock position to shift the lock mechanism to an unlock state.

5. The locking device according to claim 4, wherein the unlock unit includes an unlock member that is discrete from the operation member.

6. The locking device according to claim 1, wherein
the power feeding plug includes a hook; and
the operation member applies an operation force to the lock member to move the lock member to a position at which the lock member is capable of pushing the hook to hold the lock mechanism in the lock state.

7. The locking device according to claim 1, further comprising a second seal that prevents fluid from entering the lock mechanism, wherein the second seal is arranged between the lock member and a coupling location of the lock member.

8. The locking device according to claim 7, wherein the operation member is of a push type that is pushed in a direction orthogonal to a plane on which the second seal lies.

9. The locking device according to claim 1, wherein the operation member moves in a direction perpendicular to a direction in which the lock member moves, and the direction in which the operation member moves is the same as a direction in which the power feeding plug is inserted into the inlet.

10. The locking device according to claim 1, further comprising an unlock unit that includes an unlock member operated to shift the lock mechanism from the lock state to an unlock state, wherein the unlock unit shifts the lock mechanism to the unlock state when a condition of the unlock member being operated and a condition of wireless ID verification performed by an electronic key being accomplished are both satisfied.

11. A power receiving connector with a locking device for preventing unauthorized removal of a power feeding plug, wherein the power receiving connector includes an inlet for receiving the power feeding plug, and the power feeding plug includes a lock arm that is pivotally coupled to the power feeding plug and engageable with the inlet, the power receiving connector comprising the locking device, wherein the locking device comprises:
a lock mechanism including a lock member that is movable relative to the lock arm engaged with the inlet, wherein the lock member locks the power feeding plug to the inlet by restricting pivoting of the lock arm; and
an operation member arranged in the lock mechanism and operated at least when shifting the lock mechanism to a lock state, wherein the operation member applies an operation force to the lock mechanism to mechanically move the lock member to a position where the pivoting of the lock arm is restricted and shift the lock mechanism to a lock state.

12. The power receiving connector with a locking device according to claim 11, further comprising a seal arranged between the operation member and a location to which the operation member is coupled, wherein the seal prevents fluid from entering the lock mechanism.

13. The power receiving connector with a locking device according to claim 11, further comprising a lock state holding unit that mechanically cooperates with the operation member, when operated, to hold the operation member at a location that keeps the lock mechanism in the lock state.

14. The power receiving connector with a locking device according to claim 11, further comprising:
an actuator that moves the lock member to a lock position to hold the lock mechanism in the lock state;
an unlock unit that operates the actuator to return the lock member from the lock position to an unlock position to shift the lock mechanism to an unlock state.

15. The power receiving connector with a locking device according to claim 14, wherein the unlock unit includes an unlock member that is discrete from the operation member.

16. The power receiving connector with a locking device according to claim 11, wherein
the power feeding plug includes a hook; and
the operation member applies an operation force to the lock member to move the lock member to a position at which the lock member is capable of pushing the hook to hold the lock mechanism in the lock state.

17. The power receiving connector with a locking device according to claim 11, further comprising a second seal that prevents fluid from entering the lock mechanism, wherein the second seal is arranged between the lock member and a coupling location of the lock member.

18. The power receiving connector with a locking device according to claim 17, wherein the operation member is of a push type that is pushed in a direction orthogonal to a plane on which the second seal lies.

19. The power receiving connector with a locking device according to claim 11, wherein the operation member moves in a direction perpendicular to a direction in which the lock member moves, and the direction in which the operation member moves is the same as a direction in which the power feeding plug is inserted into the inlet.

20. The power receiving connector with a locking device according to claim 11, further comprising an unlock unit that includes an unlock member operated to shift the lock mechanism from the lock state to an unlock state, wherein the unlock unit shifts the lock mechanism to the unlock state when a condition of the unlock member being operated and a condition of wireless ID verification performed by an electronic key being accomplished are both satisfied.

* * * * *